(12) United States Patent
Albrecht

(10) Patent No.: US 9,278,403 B2
(45) Date of Patent: Mar. 8, 2016

(54) POWER SOURCE WITH RECHARGEABLE ENERGY STORAGE DEVICE

(71) Applicant: ILLINOIS TOOL WORKS INC., Glenview, IL (US)

(72) Inventor: Bruce Patrick Albrecht, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/444,692

(22) Filed: Jul. 28, 2014

(65) Prior Publication Data

US 2014/0332516 A1    Nov. 13, 2014

Related U.S. Application Data

(63) Continuation of application No. 12/755,087, filed on Apr. 6, 2010, now Pat. No. 8,791,388, which is a continuation of application No. 11/163,286, filed on Oct. 13, 2005, now Pat. No. 7,838,797, which is a continuation of application No. 10/709,835, filed on Jun. 1, 2004, now Pat. No. 6,982,398.

(51) Int. Cl.
*B23K 9/10* (2006.01)

(52) U.S. Cl.
CPC ............. *B23K 9/1075* (2013.01); *B23K 9/1006* (2013.01); *B23K 9/1043* (2013.01); *B23K 9/1062* (2013.01); *B23K 9/1081* (2013.01); *Y10T 307/615* (2015.04)

(58) Field of Classification Search
CPC .......... B23K 9/09; B23K 9/10; B23K 9/1006; B23K 9/1012; B23K 9/095
See application file for complete search history.

(56) References Cited

U.S. PATENT DOCUMENTS

| 431,563 A | 7/1890 | Denison |
|---|---|---|
| 3,365,644 A | 6/1964 | Smallman |
| 3,665,495 A | 5/1972 | Carter |
| 4,182,949 A | 1/1980 | Powers |
| 4,315,163 A | 2/1982 | Bienville |
| 4,525,621 A | 6/1985 | Puschner |
| 4,590,357 A | 5/1986 | Winkler |
| 4,705,934 A | 11/1987 | Winkler |
| 4,801,780 A | 1/1989 | Hayes |
| 5,086,208 A | 2/1992 | Habermann |

(Continued)

FOREIGN PATENT DOCUMENTS

| CN | 1045364 | 9/1990 |
|---|---|---|
| EP | 0888200 | 11/1999 |

(Continued)

OTHER PUBLICATIONS

Masahiko Yano; "Power Supply Device for Welding Machine"; Application No. S59-257066, filed Dec. 5, 1984, 8 pages.

(Continued)

*Primary Examiner* — Brian Jennison
(74) *Attorney, Agent, or Firm* — Fletcher Yoder P.C.

(57) ABSTRACT

The present invention is directed to a welding-type power source that includes a power source housing and an engine arranged in the power source housing to supply electrical power. An energy storage device is included that is in rechargeable association with the internal combustion engine and arranged to provide welding-type power for at least a given period.

20 Claims, 3 Drawing Sheets

(56) References Cited

U.S. PATENT DOCUMENTS

| | | | |
|---|---|---|---|
| 5,198,698 A | 3/1993 | Paul | |
| 5,233,159 A | 8/1993 | Day | |
| 5,250,786 A * | 10/1993 | Kikuchi et al. | 219/130.32 |
| 5,253,891 A | 10/1993 | Carlin | |
| 5,355,075 A | 10/1994 | Wilson, III | |
| 5,410,126 A | 4/1995 | Miller | |
| 6,040,555 A | 3/2000 | Tiller | |
| 6,098,734 A | 8/2000 | Kawamura | |
| 6,111,215 A | 8/2000 | Lilly | |
| 6,225,596 B1 | 5/2001 | Chandler | |
| 6,331,694 B1 | 12/2001 | Blankenship | |
| 6,362,445 B1 | 3/2002 | Marchand | |
| 6,472,846 B1 | 10/2002 | Hutchinson | |
| 6,476,354 B1 | 11/2002 | Jank | |
| 6,512,201 B2 | 1/2003 | Blankenship | |
| 6,552,303 B1 | 4/2003 | Blankenship | |
| 6,700,214 B2 | 3/2004 | Ulinski | |
| 6,700,802 B2 | 3/2004 | Ulinski | |
| 6,713,708 B2 | 3/2004 | Hedberg | |
| 6,747,246 B2 | 6/2004 | Crandell | |
| 6,777,649 B2 | 8/2004 | Reynolds | |
| 6,818,860 B1 | 11/2004 | Stava | |
| 6,825,435 B1 | 11/2004 | Brown | |
| 6,833,683 B2 | 12/2004 | Winkler | |
| 6,833,883 B2 | 12/2004 | Park | |
| 6,982,398 B2 | 1/2006 | Albrecht | |
| 7,183,517 B2 | 2/2007 | Albrecht | |
| 7,339,134 B2 | 3/2008 | Stropki | |
| 7,838,797 B2 | 11/2010 | Albrecht | |
| 2004/0195998 A1 | 10/2004 | Winkler | |
| 2005/0073279 A1 | 4/2005 | Fenley | |
| 2005/0263514 A1 | 12/2005 | Albrecht | |
| 2010/0187210 A1 | 7/2010 | Albrecht | |

FOREIGN PATENT DOCUMENTS

| | | |
|---|---|---|
| GB | 2001489 | 1/1979 |
| GB | 2316244 | 2/1998 |
| JP | 54155950 | 12/1979 |
| JP | 56077068 | 6/1981 |
| JP | 57112977 | 7/1982 |
| JP | 61135479 | 6/1986 |
| JP | 3297572 | 12/1991 |
| JP | 4327375 | 11/1992 |
| JP | 4330337 | 11/1992 |
| JP | 4356372 | 12/1992 |
| JP | 5277729 | 10/1993 |
| JP | 05318117 | 12/1993 |
| JP | 687082 | 3/1994 |
| JP | 6106623 | 4/1994 |
| JP | 6182548 | 7/1994 |
| JP | 6262365 | 9/1994 |
| JP | 6297145 | 10/1994 |
| JP | 7195523 | 8/1995 |
| JP | 994661 | 4/1997 |
| JP | 9288507 | 11/1997 |
| JP | 10272563 | 10/1998 |
| JP | 10314939 | 12/1998 |
| JP | 11254535 | 9/1999 |
| JP | 11320110 | 11/1999 |
| JP | 200266737 | 3/2002 |
| JP | 200388955 | 3/2003 |
| JP | 2003116284 | 4/2003 |
| JP | 2003125241 | 4/2003 |
| JP | 2003136240 | 5/2003 |
| JP | 2003191079 | 7/2003 |
| JP | 200417152 | 1/2004 |
| JP | 200417154 | 1/2004 |
| JP | 2004340856 | 12/2004 |
| SU | 1738098 | 5/1992 |
| WO | 9734727 | 9/1997 |

OTHER PUBLICATIONS

Battery Welder brochure-Output 70-150A, MIGHT ARC, Publisher: Might Industrial Co., Ltd., Published in: JP.

* cited by examiner

POWER SOURCE WITH RECHARGEABLE ENERGY STORAGE DEVICE

CROSS-REFERENCE TO RELATED APPLICATION APPLICATIONS

The present application is a continuation and claims priority of U.S. patent application Ser. No. 12/755,087, filed on Apr. 6, 2010, and entitled "Hybrid Welding-Type Power Source", which is itself a continuation of U.S. patent application Ser. No. 11/163,286, filed on Oct. 13, 2005, entitled "Fuel Saving Engine Driven Welding-Type Device and Method of Use", and issued as U.S. Pat. No. 7,838,797 on Nov. 23, 2010, which is itself a continuation of U.S. patent application Ser. No. 10/709,835, filed on Jun. 1, 2004, entitled "Fuel Saving Engine Driven Welding-Type Device and Method of Use", and issued as U.S. Pat. No. 6,982,398 on Jan. 3, 2006, all in the name of Bruce Albrecht.

BACKGROUND OF THE INVENTION

The present invention relates generally to welding-type systems and, more particularly, to a portable welding-type apparatus designed to respond "on-demand" to operator input. The welding-type apparatus includes an energy storage device capable of providing immediate and sufficient power in conjunction with an internal combustion engine that can then be started to compliment the energy storage device and provide sufficient operational welding-type power.

Traditional welding-type apparatus can be broken into two basic categories. The first category receives operational power from transmission power receptacles, also known as static power. The second is portable or self-sufficient, stand alone welders having internal combustion engines, also known as rotating power. While in many settings conventional static power driven welders are preferred, engine driven welders enable welding-type processes where static power is not available. Rotating power driven welders operate by utilizing power generated from engine operation. As such, engine driven welders and welding-type apparatus allow portability and thus fill an important need.

Static powered welders initiate the weld process by way of a trigger on a hand-held torch or with an electrically charged stick connected to a charged electrode.

Rotating power driven welders operate similarly, as long as the engine is running. If the engine is shut down, there is typically no residual power to create an arc. To once again weld, the engine must be started and run at operational speed to produce the arc. Therefore, it is simply not possible to manually start and stop the engine between each and every break in the welding process. Further, even during longer periods, operators may find it easier to let the engine run because of distance to the engine, a misconception that it is better for the engine, or just out of habit.

However, the welding process is usually not a continuous one. That is, there are many starts and stops involved in welding, and often, other steps are performed between welding. Such steps can include removing slag, rearranging components, acquiring additional supplies, checking one's work, or simply taking a break.

Further, rotating power driven welders typically require that the engine be running at full speed before sufficient power is generated to perform the welding-type process. That is, when initiating the welding-type process, an operator must first start the engine and wait until the engine is at operational speed before beginning the welding-type process. Operational speed is idle for non-welding operation and full output for a welding-type process. This creates long periods of user downtime, or results in a waste of fossil fuel by leaving the engine running. To avoid repeatedly waiting for the engine to reach full state, operators may allow the engine to idle during breaks in the welding-type process. That is, unlike traditional static welders that only use a significant amount of power during the welding-type process, rotating power driven welders can remain running and continually use energy even during a break in the welding-type process.

Accordingly, although operation of the engine is not continually necessary, operators allow the engine to continuously run. Running the engine at all consumes excess fuel and creates additional noise and exhaust unnecessarily.

As such, although rotating power driven welders provide the required power over a suitable duration, startup and shutdown of the engine and the delay associated therewith, and the wasted use of energy of allowing the engine to run continuously, are significant drawbacks to rotating power driven welding-type apparatus.

It would therefore be desirable to design a portable welding-type device that is operationally equivalent to static welders. Specifically, it would be desirable to have a portable welding-type device that operates on-demand and meets the power requirements of the desired welding-type process.

BRIEF DESCRIPTION OF THE INVENTION

The present invention is directed to a portable welding-type apparatus that overcomes the aforementioned drawbacks. Specifically, the present invention includes a portable welding-type power source that includes both an energy storage device configured to supply welding-type power and an engine driven power source. A controller is included that switches between the energy storage device and the engine driven power source to deliver power to drive a welding-type process in an "on demand" manner.

In accordance with one aspect of the present invention, a welding-type power source is disclosed that includes a power source housing and an internal combustion engine driven power source arranged in the power source housing to supply electrical power. An energy storage device is included that is in rechargeable association with the internal combustion engine driven power source and arranged to provide welding-type power for at least a given period.

In accordance with another aspect of the present invention, a method of performing a welding-type process is disclosed that includes initiating a welding-type process from an energy storage device and starting a fossil fuel driven engine. Upon completion of starting the fossil fuel engine, the method includes switching the welding-type process from the energy storage device to the fossil fuel driven engine.

According to another aspect of the present invention, a welding-type apparatus is disclosed that includes a welding-type apparatus housing and an engine driven power source configured to supply electrical power and arranged substantially within the welding-type apparatus housing. An energy storage device is included that is connected to the engine driven power source and configured to supply power for a welding-type process alternately with the engine driven power source.

According to another aspect of the invention, a welding-type power source is disclosed that includes a housing and a generator disposed in the housing and configured to deliver a welding-type power. An energy storage device is rechargeably connected to the generator and configured to deliver welding-type power over a given duration.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a welding-type apparatus and, more specifically, to a portable welding-type power source that includes both an energy storage device and an engine/generator, each arranged to be a primary welding-type power source. The present invention also includes a controller configured to selectively drive a welding-type process between the energy storage device and the engine, or combination thereof.

As one skilled in the art will fully appreciate, the hereinafter description of welding devices not only includes welders but also includes any system that requires high power outputs, such as heating, cutting systems, aircraft ground support, and auxiliary power/power backup systems.

Aircraft ground power units are utilized to power aircraft when on the ground. Larger aircraft tend to utilize ground power units which output AC power while smaller aircraft tend to utilize ground power units which output DC power, typically at about 28 volts and in the range of several hundred amps. Ground power units that output DC or AC power may develop the DC power from a 3-phase AC source such as a static or rotating converter or a generator. In either case, a transformer, rectifier, and/or inverter arrangement may be used to convert the AC power to the desired AC or DC output as when generating a welding-type power.

Therefore, the present invention is equivalently applicable with any device requiring high power output, including welders, plasma cutters, induction heaters, generators, and the like. Reference to welding power, welding-type power, or welders generally, includes welding, cutting, heating power, aircraft ground support, or auxiliary power generators. Description of a welding apparatus illustrates just one embodiment in which the present invention may be implemented. The present invention is equivalently applicable with systems such as cutting, induction heating systems, aircraft ground support systems, and power generation systems.

Figure 1:
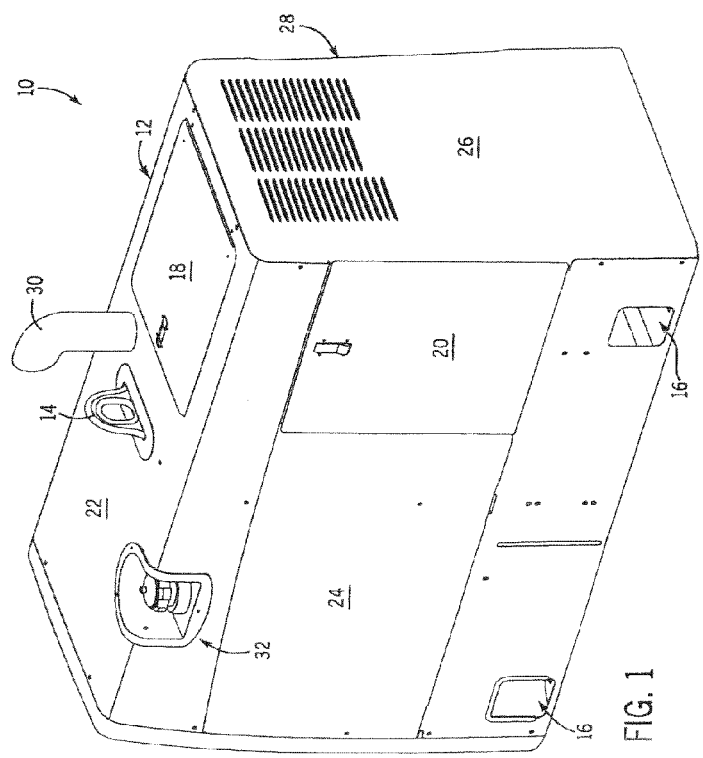
FIG. 1 is a perspective view of a welding-type apparatus incorporating the present invention.

FIG. 1 shows a welding-type device 10. The welding-type device 10 includes a housing 12 which encloses the internal components of the welding device. Optionally, the welding-type device 10 includes a loading eyehook 14 and/or fork recesses 16. The loading eyehook 14 and the fork recesses 16 facilitate the portability of the welding-type device 10. Optionally, the welding-type device 10 could include a handle and/or wheels as a means of device mobility. The housing 12 also includes a plurality of access panels 18, 20. Access panel 18 provides access to a top panel 22 of housing 12 while access panel 20 provides access to a side panel 24 of housing 12. A similar access panel is available on an opposite side. These access panels 18, 20, provide access to the internal components of the welding-type device 10 including, as will be described, an energy storage device suitable for providing welding-type power. An end panel 26 includes a louvered opening 28 to allow for air flow through the housing 12.

The housing 12 of the welding-type device 10 also houses an internal combustion engine. The engine is evidenced by an exhaust port 30 and a fuel port 32 that protrude through the housing 12. The exhaust port 30 extends above the top panel 22 of the housing 12 and directs exhaust emissions away from the welding-type device 10. The fuel port 32 preferably does not extend beyond the top panel 22 or side panel 24. Such a construction protects the fuel port 32 from damage during transportation and operation of the welding-type device 10.

Figure 2:
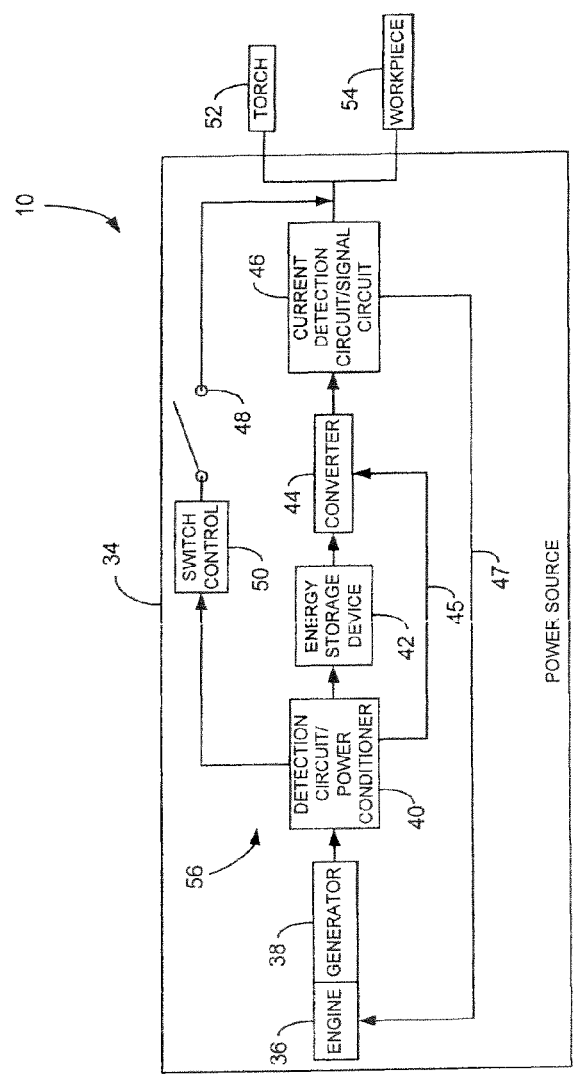
FIG. 2 is a block diagram illustrating some of the components of the welding-type apparatus shown in FIG. 1 in accordance with one embodiment of the invention.

Referring to FIG. 2, a block diagram of the components of a welding-type device 10, such as that shown in FIG. 1 is shown. Specifically, a plurality of elements forming a power source 34 of the welding-type device 10 is shown. Within the power source 34 is an engine 36 connected to a generator 38. When in operation, the engine 36 drives the generator 38 to produce power which is delivered to a detection circuit/power conditioner 40. The detection circuit/power conditioner 40 is in electrical communication with an energy storage device 42. The energy storage device 42 is controlled to provide power to a converter 44, which, in turn, delivers the conditioned power to a current detection circuit/signal circuit 46. As will be described, a switch 48 is provided that may be controlled by a switch controller 50 to deliver power from the engine 36 and generator 38 to a torch 52 and a workpiece 54 to effectuate a desired welding-type process, instead of from the energy storage device 42, that is merely charged by the engine 36 and generator 38. Therefore, it should be appreciated that together the detection circuit/power conditioner 40, current detection circuit/signal circuit 46, switch control 50, and switch 48 serve as a controller, designated generally by reference numeral 56.

When the power source 34 is not providing any power to drive a welding-type process, the switch 48 is in the open position and the engine 36 is off, as shown, and the converter 44 prohibits the energy storage device 42 from discharging. When an operator desires to begin a welding-type process, the operator engages the torch 52 which causes an electrical connection between the energy storage device 42 and the torch 52 and workpiece 54. Specifically, the converter 44 provides the power necessary for the welding-type process to the current detection circuit/signal circuit 46 which then delivers the power to the torch 52 and workpiece 54. As such, the power necessary to effectuate the welding-type process is delivered substantially immediately upon initiation of the torch input by the operator, thereby providing on-demand power for the welding-type process.

As will be described, once the current detection circuit/signal circuit 46 senses current drawn from the energy storage device 42, the current detection circuit/signal circuit 46 generates a start signal 47 that is sent to the engine 36/generator 38 to start the engine 36. Therefore, substantially simultaneously with the converter 44 closing the electrical connection with the energy storage device 42, a start signal 47 is generated and sent by the current detection circuit/signal circuit 46 to initiate engine start-up.

While it is contemplated that the energy storage device 42 be configured to readily deliver a power suitable for the desired welding-type process, in alternate embodiments, it may not be so configured. Preferably, the power delivered from the energy storage device 42 to the converter 44 is converted by the converter 44 to a power suitable for welding-type processes. However, it is also contemplated that the converter 44 can include a boost circuit to increase the voltage from the energy storage device to be within a suitable range for a particular welding-type process.

It is also contemplated that a boost and buck circuit configuration may be used in conjunction with the energy storage device 42 to deliver a power desired for a particular welding-type process. As such, it should be recognized that numerous configurations may be utilized to configure the converter 44. That is, the use of a forward converter, resonant converter, Cuk converter, full-bridge converter, half-bridge converter, AC bridge and the like, are equivalent substitutions.

As stated, substantially simultaneously with the current detection circuit/signal circuit 46, a start signal is generated by the current detection circuit/signal circuit 46. The start signal is sent from the current detection circuit/signal circuit 46 to the engine 36, which causes the engine 36 to begin a start-up process.

Therefore, while the energy storage device 42 is providing operational power for the welding-type process, the engine 36 begins a start-up period. During this start-up period, the engine 36 starts and while getting up to operational speed, the generator 38 is not yet sufficiently driven to generate operational power. During this start-up or initialization period, power is instantaneously supplied by the energy storage device 42, and the detection circuit/power conditioner circuit 40 operates as a sensor to determine whether the generator 38 is producing enough power for the welding-type process.

Once the current detection circuit/power conditioner circuit 40 determines that the generator is providing a sufficient power, the engine 36 and generator operate in a post-initialization or post-start-up period and the current detection circuit/power conditioner circuit 40 sends a feedback signal 45 to the converter 44 and the switch control 50 indicating that the engine 36 and generator 38 are operating sufficiently to deliver power suitable for driving the welding-type process.

Accordingly, the converter 44 opens the electrical connection between the energy storage device 42 and the current detection circuit/signal circuit 46. Substantially simultaneously with the converter 44 opening, or immediately prior to, the switch control 50 closes the switch 48 thereby providing power from the engine 36 to the torch 52. The electrical opening performed by the converter 44 and electrical closing of the switch 48 are performed rapidly and substantially simultaneously such that the welding-type process performed between the torch 52 and workpiece 54 is uninterrupted and unnoticeable to the user because of the internal switching. That is, the switching of driving electrical sources occurs such that the operator of the welding-type device 10 is unaware of the switching and the welding-type process occurs unimpeded.

However, if a break in the welding-type process occurs, the current detection/signal circuit 46 senses an interruption in the welding-type process and generates a signal that is sent to shutdown the engine 36. A time delay can be used to prevent frequent start/stops of engine 36 for brief welding interruptions. Additionally, before shutting down, the detection circuits 40, 46 ensure that the energy storage device 42 is substantially recharged. As such, the welder operates more efficiently, and noise and combustion emission generated by the engine 36 are reduced.

Once power is no longer being delivered by the generator 38 and is detected by the detection circuit/power conditioner 40, the detection circuit/power conditioner 40 sends a signal to the switch control 50 that causes the switch control 50 to open the switch 48.

After the break in the welding-type process ends and the operator re-engages the torch 52, the previously described operation is reiterated. That is, operational power is again delivered by the energy storage device 42 while the engine 36 begins the start-up period. Once engine start-up is complete, an electrical configuration of the power source 34 is switched to deliver power from the engine 36 and generator 38.

In accordance with one embodiment of the invention, the engine 36 and generator 38 are configured to deliver more power than necessary to drive the welding-type process. In this case, once the engine 36 is operating to deliver operational power to drive the welding-type process, the detection circuit/power conditioner 40 may intermittently generate some power for the energy storage device 42 thereby delivering power to the energy storage device 42. That is, the detection circuit/power conditioner 40 closes an electrical connection to the energy storage device 42. However, in accordance with a preferred embodiment, raw power from the generator 38 is not delivered directly to the energy storage device 42. Instead, the detection circuit/power conditioner 40 includes a conversion circuit configured to condition the power delivered to the energy storage device to be within a charging power range. For example, it is contemplated that the detection circuit/power conditioner 40 may include a buck converter, or other similar converter, to limit current supplied to the energy storage device 42. As such, the energy storage device 42 is preferably recharged with a trickle charge whenever the engine 36 is at full operational speed.

In accordance with another embodiment of the invention shown in FIG. 2, power is not diverted to the energy storage device 42 while the engine 36 is providing power to drive the welding-type process. Rather, upon sensing a break in the welding-type process, the switch control 50 opens the switch 48 and the detection circuit/power conditioner 40 closes to deliver a charging power to the energy storage device 42. In this case, the engine 36 remains running for a predetermined time after the break in the welding-type process. As such, the detection circuit/power conditioner 40 receives power from the generator 38, converts the power to a suitable charging power, and provides the charging power to the energy storage device 42 to recharge the energy storage device 42 for the next operational cycle of the welding-type process.

In accordance with yet another embodiment of the invention shown in FIG. 2, start-up of the engine 36 is only initiated once the energy storage device 42 is sufficiently depleted. That is, the converter 44 monitors characteristics of the power delivered by the energy storage device 42 and if a current or voltage characteristic of the power output of the energy storage device 42 drops below a threshold, the engine 36 enters a start-up period. Once the engine enters a post-start-up period, the electrical configuration of the power source 34 is switched to drive the welding-type process from the engine 36 and the energy storage device 42 is switched off. Accordingly, the energy storage device 42 is efficiently utilized, and short engine running durations are avoided. Again, it should be appreciated that together the detection circuit/power conditioner 40, current detection circuit/signal circuit 46, switch control 50, and switch 48 serve to function as a controller, designated generally by reference numeral 56.

Figure 3:
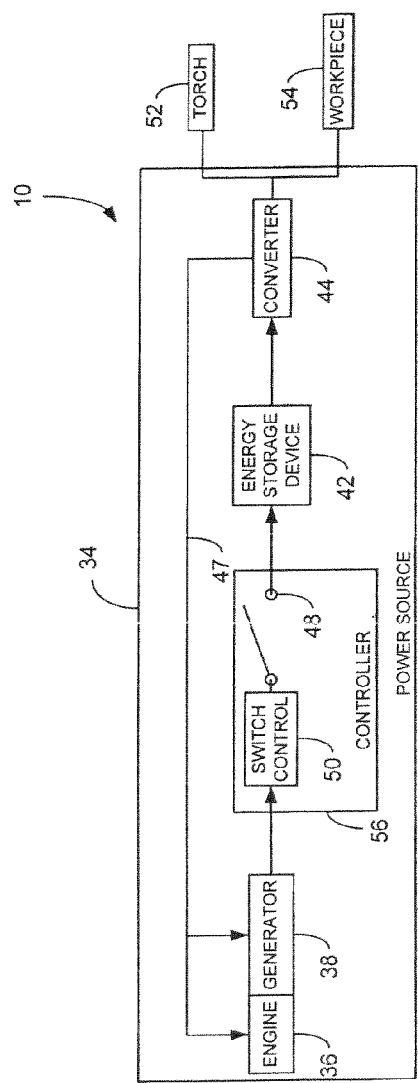
FIG. 3 is a block diagram illustrating some of the components of the welding-type apparatus shown in FIG. 1 in accordance with another embodiment of the invention.

Referring now to FIG. 3, a block diagram, in accordance with an alternative embodiment of the components of welding-type device 10 of FIG. 1, is shown. In accordance with this embodiment, the engine 36 and generator 38 are connected to the switch control 50 and switch 48. The switch 48 is controlled by switch control 50 to limit power delivery from the generator 38 to the energy storage device 42. As such, operational power to drive the welding-type process is always delivered from the energy storage device 42 while the engine 36 and generator 38 serve to recharge the energy storage device 42. That is, once the operator initiates a welding-type process, the converter 44 allows power to be delivered from the energy storage device 42 to the torch 52, and ultimately, the workpiece 54. Power delivery continues from the energy storage device 42 until the welding-type process ceases. The engine 36 and generator 38 are only caused to operate should the energy storage device 42 be depleted to a predetermined level in order to avoid excessive operation and starts/stops of the engine 36 and generator 38. As such, the energy storage device 42 serves to provide on-demand power for a desired welding-type process and the engine 36 serves to recharge the energy storage device 42.

In accordance with one embodiment, the engine 36 is caused to initiate start-up in response to the converter 44 supplying any power to the torch 52/workpiece 54 and sends a start command signal 47 to the engine 36/generator 38. As such, engine start-up begins substantially simultaneously with operator initiation of the welding-type process. In this case, the engine 36 begins start-up while the energy storage device 42 is driving the welding-type process. Once the engine 36 reaches a post-start-up period, the switch control 50 closes the switch 48 and a charging power is delivered to the energy storage device 42. Therefore, the switch control 50 and switch 48 function as a controller 56 designed to deliver charging power to the energy storage device 42 once the engine 36 reaches the post-start-up period. The charging power is within a charging power range for the energy storage device 42. Accordingly, as power is being drawn from the energy storage device 42 to drive the welding-type process, the energy storage device 42 is simultaneously being recharged. When the welding-type process ends, the engine 36 continues operating for a predetermined period to allow the energy storage device 42 to reach full charge.

In accordance with another embodiment, the engine 36 is caused to initiate start-up only after a break in the welding-type process is detected. As such, engine start-up begins shortly after the welding-type process ends. In this case, the engine 36 begins start-up once the energy storage device 42 is no longer driving the welding-type process. Once the engine 36 reaches a post-start-up period, the switch control 50 closes the switch 48 and a charging power within a charging power range of the energy storage device 42 is delivered directly from the generator to the energy storage device 42. The engine 36 is configured to continue operation until the energy storage device 42 reaches a substantial recharge state.

In either case, the invention allows on-demand delivery of power necessary to effectuate a desired welding-type process. Furthermore, these specific configurations allow the size and power generation ability of the engine 36 and generator 38 to be smaller than an engine and generator configuration that is otherwise necessary.

Therefore, the above-described system enables on-demand responsiveness from a portable welding-type power source. The system generates less noise and consumes less fuel than traditional engine driven welding-type power sources that do not utilize such an energy storage device. It is contemplated, that the engine and generator may operate at various frequencies and speeds, while not affecting the welding or auxiliary output.

It is contemplated that the present invention may be utilized with a plurality of welding-type process. For example, the welding-type apparatus may operate according to a Metal Inert Gas (MIG) welding-type process, formerly known as Gas Metal Arc Welding-type (GMAW) process, a Tungsten Inert Gas (TIG) welding-type process, a Shielded Metal Arc Welding-type (SMAW) process, a plasma-cutting process, induction heating process, aircraft ground power process or other welding-type processes.

Therefore, the present invention includes a welding-type power source includes a power source housing and an internal combustion engine driven power source arranged in the power source housing to supply electrical power. An energy storage device is included that is device in rechargeable association with the internal combustion engine driven power source and arranged to provide welding-type power for at least a given period.

In another embodiment of the present invention, a method of performing a welding-type process is disclosed that includes initiating a welding-type process from an energy storage device and starting a fossil fuel driven engine. Upon completion of starting the fossil fuel driven engine, the method includes switching the welding-type process from the energy storage device to the fossil fuel driven engine.

An alternate embodiment of the present invention has a welding-type apparatus housing and an engine driven power source configured to supply electrical power and arranged within the welding-type apparatus housing. An energy storage device is included that is connected to the engine driven power source and configured to supply power for a welding-type process alternately with the engine driven power source.

A further embodiment of the present invention includes a welding-type power source is disclosed that includes a housing and a generator disposed in the housing and configured to deliver a welding-type power. An energy storage device is rechargeably connected to the generator and configured to deliver welding-type power over a given duration.

The present invention has been described in terms of the preferred embodiment, and it is recognized that equivalents, alternatives, and modifications, aside from those expressly stated, are possible and within the scope of the appending claims.

What is claimed is:

1. A welding-type power source having an output for providing a desired welding-type power comprising:
   a housing;
   an internal combustion engine disposed in the housing;
   a generator operatively connected to the internal combustion engine and configured to deliver generator power;
   a detection circuit configured to detect the generator power delivered by the generator; and
   an energy storage device rechargeably connected to the generator and configured to deliver stored energy when the detection circuit detects that the generator power is less than the desired welding-type power.

2. The welding-type power source of claim 1, wherein the generator is configured to deliver an auxiliary power.

3. The welding-type power source of claim 1, comprising a controller configured to switch an electrical configuration of the welding-type power source to deliver power from one or both of the generator and the energy storage device to provide the desired welding-type power.

4. The welding-type power source of claim 3, wherein the desired welding-type power is maintained such that a welding-type process is uninterrupted during switching of the source of the desired welding-type power between the energy storage device and the generator.

5. A welding-type device comprising:
   a power supply having a weld power circuit that receives input power on a power input and provides a desired weld power output;
   an engine connected to a generator having an output connected to the power input;

a battery connected to the power supply and configured to provide a battery power signal to the power input; and a controller connected to the power supply and configured to selectively connect and disconnect the battery power signal from the power input based on an operating condition of the engine.

6. The welding-type device of claim 5, wherein the generator is connected to recharge the battery during non-generation of the desired weld power output.

7. A welding-type power source comprising:

an engine-driven generator connected to provide generated power on a generator output, wherein when an engine of the engine-driven generator is operating at a first speed, a generator of the engine-driven generator provides sufficient power to perform a welding-type process, and when the engine is operating at less than the first speed, the generator does not provide sufficient power to perform a welding-type process;

an energy storage device connected to provide stored energy on a stored energy output;

an energy selection circuit connected to the generator output, the stored energy output, and a power input, wherein the energy selection circuit selectively connects one, none, or both of the generator output and the stored energy output to the power input;

a detection circuit configured to detect the generated power provided by the engine-driven generator; and a controller connected to control the energy selection circuit, wherein the energy selection circuit connects the generator output to the power input when the detection circuit detects that the generator provides sufficient power to perform a welding-type process, and wherein the energy selection circuit connects the stored energy output to the power input when the detection circuit detects that the generator does not provide sufficient power to perform a welding-type process.

8. The welding-type power source of claim 7, wherein the energy selection circuit connects the generator output to the power input when the engine is at the first speed, and wherein the energy selection circuit connects the stored energy output to the power input when the engine is at less than the first speed.

9. The welding-type power source of claim 8, wherein the energy selection circuit connects the generator output to the power input when the engine is at a full speed, and wherein the energy selection circuit connects the stored energy output to the power input when the engine is at an idle speed.

10. The welding-type power source of claim 8, comprising an electrical parameter circuit feedback circuit connected to the generator output.

11. The welding-type power source of claim 7, wherein the energy selection circuit selectively connects both of the generator output and the stored energy output to the power input.

12. A method of providing welding-type power comprising:

providing generated power using an engine-driven generator;

providing stored energy in an energy storage device;

detecting via a detection circuit the generated power provided by the engine-driven generator;

deriving welding-type power from the generated power when the detection circuit detects that the engine-driven generator provides sufficient power to perform a welding-type process; and deriving welding-type power from the stored energy when the detection circuit detects that the engine-driven generator does not provide sufficient power to perform a welding-type process.

13. The method of claim 12, wherein deriving welding-type power from the generated power occurs when an engine of the engine-driven generator is at a first speed, and wherein deriving welding-type power from the stored energy occurs when the engine is at less than the first speed.

14. The method of claim 13, wherein deriving welding-type power from the generated power occurs when the engine is at a full speed, and wherein deriving welding-type power from the stored energy occurs when the engine is at an idle speed.

15. The method of claim 12, comprising monitoring an engine generator parameter and changing from deriving welding-type power from the generated power to deriving welding-type power from the stored energy in response to the monitoring.

16. The method of claim 15, wherein monitoring includes monitoring an electrical engine generator parameter.

17. The method of claim 12, comprising simultaneously deriving welding-type power from the generated power and deriving welding-type power from the stored energy.

18. The method of claim 17, comprising ceasing deriving welding-type power from the stored energy when the engine-driven generator provides sufficient power to perform the welding-type process.

19. The method of claim 18, comprising starting deriving welding-type power from the stored energy when the engine-driven generator does not provide sufficient power to perform the welding-type process, and the welding-type process is being performed.

20. The method of claim 17, comprising starting deriving welding-type power from the stored energy when the engine-driven generator does not provide sufficient power to perform the welding-type process, and the welding-type process is being initiated.

* * * * *